United States Patent
Waghmare et al.

(10) Patent No.: US 11,532,989 B2
(45) Date of Patent: Dec. 20, 2022

(54) USING PARASITIC CAPACITANCE OF A TRANSFORMER AS A TANK ELEMENT IN A DC-DC CONVERTER

(71) Applicant: Hamilton Sundstrand Corporation, Charlotte, NC (US)

(72) Inventors: Piyush Nilchandra Waghmare, Bangalore (IN); Jithesh K P, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 92 days.

(21) Appl. No.: 17/023,648

(22) Filed: Sep. 17, 2020

(65) Prior Publication Data
US 2021/0159803 A1 May 27, 2021

(30) Foreign Application Priority Data
Nov. 27, 2019 (IN) .............................. 201911048637

(51) Int. Cl.
| H02M 3/00 | (2006.01) |
| H02M 3/335 | (2006.01) |
| H02M 7/5387 | (2007.01) |
| H02M 7/48 | (2007.01) |
| H02M 1/00 | (2006.01) |

(52) U.S. Cl.
CPC ... *H02M 3/33576* (2013.01); *H02M 7/53871* (2013.01); *H02M 1/0003* (2021.05); *H02M 3/01* (2021.05); *H02M 3/015* (2021.05); *H02M 7/4815* (2021.05)

(58) Field of Classification Search
CPC ............. H02M 7/4811; H02M 7/4815; H02M 7/4826; H02M 3/01; H02M 3/015
See application file for complete search history.

(56) References Cited

U.S. PATENT DOCUMENTS

| 6,344,979 B1 | 2/2002 | Huang et al. | |
| 6,541,925 B1* | 4/2003 | Chang | H02M 7/538 |
| | | | 315/307 |
| 8,619,438 B2 | 12/2013 | Wang et al. | |

(Continued)

FOREIGN PATENT DOCUMENTS

| CN | 106655781 B | 9/2018 |
| CN | 108631597 B | 10/2019 |

(Continued)

OTHER PUBLICATIONS

Aghaei et al., "A High Voltage Variable Inductor LCC Resonant Converter with High Power Factor over Wide Load Range," 10th International Power Electronics, Drive Systems and Technologies Conference, Feb. 12-14, 2019, pp. 279-284.

(Continued)

*Primary Examiner* — Gary A Nash
(74) *Attorney, Agent, or Firm* — Cantor Colburn LLP

(57) ABSTRACT

Systems and methods for using parasitic capacitance of a transformer as an element in a resonant converter are provided. Aspects include determining a parasitic capacitance associated with a transformer, determining a resonant circuit configuration based at least in part on the parasitic capacitance associated with the transformer, and providing a resonant converter comprising the resonant circuit and the transformer.

17 Claims, 5 Drawing Sheets

(56) References Cited

U.S. PATENT DOCUMENTS

| | | |
|---|---|---|
| 10,003,275 B2 | 6/2018 | Chen |
| 10,256,739 B2 | 4/2019 | Hao et al. |
| 10,333,410 B2 | 6/2019 | Zhang et al. |
| 2009/0231887 A1 | 9/2009 | Ye et al. |
| 2009/0303753 A1* | 12/2009 | Fu ................. H02M 3/3376 363/20 |
| 2013/0294113 A1 | 11/2013 | Liang et al. |
| 2014/0160800 A1* | 6/2014 | Zimmanck ........... H02M 5/293 363/17 |
| 2014/0268897 A1* | 9/2014 | Zimmanck ........ H02M 3/33573 363/17 |
| 2015/0109824 A1* | 4/2015 | Chen ............... H02M 3/33569 363/17 |
| 2016/0248332 A1* | 8/2016 | Ohtake ............ H02M 3/33546 |
| 2018/0083545 A1* | 3/2018 | Vijayan ................. H02M 3/01 |
| 2018/0226896 A1 | 8/2018 | Miller et al. |
| 2018/0301997 A1* | 10/2018 | Lee ................. H02M 3/33546 |
| 2018/0366267 A1 | 12/2018 | Raimann |

FOREIGN PATENT DOCUMENTS

| | | |
|---|---|---|
| CN | 110336464 A | 10/2019 |
| WO | 2016160775 A1 | 10/2016 |

OTHER PUBLICATIONS

EP Search Report; dated Apr. 29, 2021; Application No. 20210078.0; Filed: Nov. 26, 2020; 15 pages.

* cited by examiner

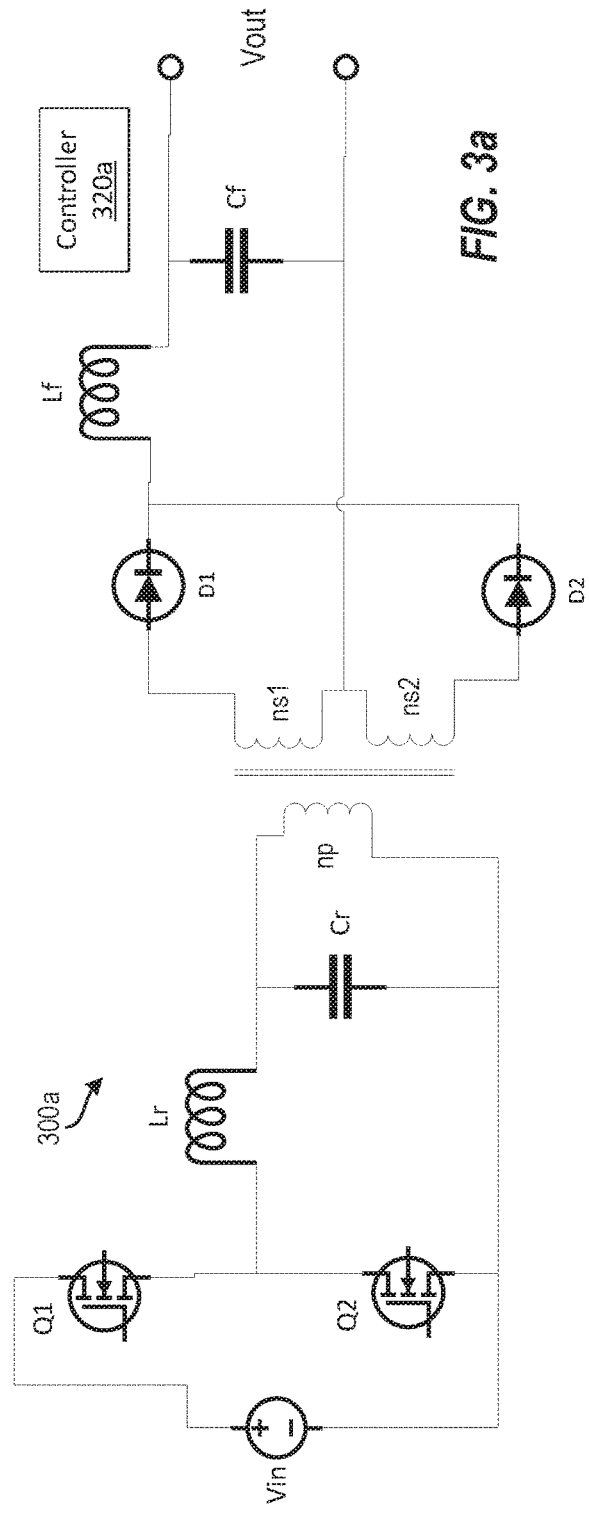
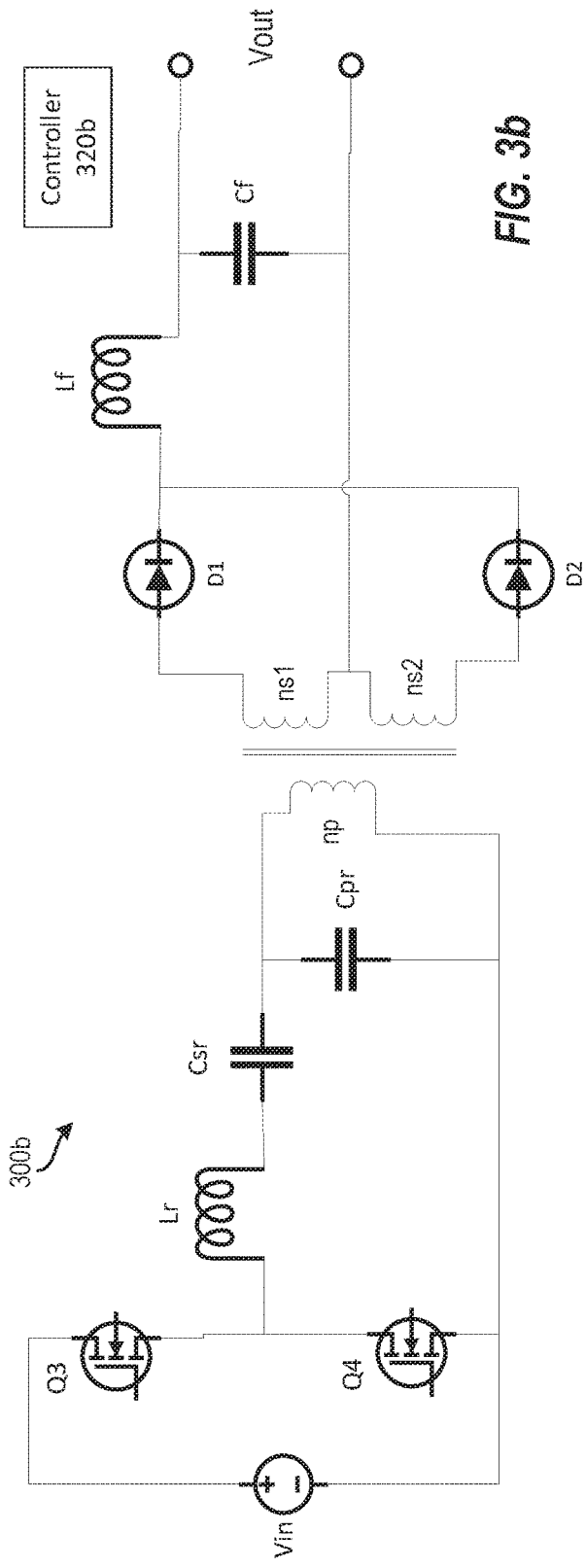

USING PARASITIC CAPACITANCE OF A TRANSFORMER AS A TANK ELEMENT IN A DC-DC CONVERTER

CROSS-REFERENCE TO RELATED APPLICATIONS

This application claims the benefit of Indian Patent Application No. 201911048637 filed Nov. 27, 2019, which is incorporated herein by reference in its entirety.

BACKGROUND

The present invention generally relates to DC-DC converters, and more specifically, to using parasitic capacitance of a planar transformer as a tank element in a DC-DC converter.

The architecture of aircraft are evolving based on application needs, customer needs, market segments and the availability of advanced technologies. In the process there are attempts to make aircraft more intelligent, more electrical and more data driven. Considering the cost of an aircraft design life cycle and operations, having a modular and re-usable architecture while still maintaining robustness and reliability of the design can be a challenge.

With current technology trends, a move towards electrically powered aircraft requires more efficient and consistent power conversion. Standard LLC converters are, typically, best suited for fast moving electrical aircraft because the high power density and high efficiency made them more suitable for electrical architecture

SUMMARY

Embodiments of the present invention are directed to system. A non-limiting example of the system includes a power inverter, a resonant circuit coupled to a transformer, the transformer having a parasitic capacitance, and a rectifier coupled to an output of the transformer, wherein the resonant circuit comprises at least one inductor, wherein a resonant frequency for the resonant circuit is based on the at least one inductor and the parasitic capacitance of the transformer.

Embodiments of the present invention are directed to system. A non-limiting example of the system includes a power inverter, a resonant circuit coupled to a transformer, the transformer having a parasitic capacitance, and a rectifier coupled to an output of the transformer, wherein the resonant circuit comprises at least one inductor and at least one capacitor, wherein a resonant frequency for the resonant circuit is based on the at least one inductor, the at least on capacitor, and the parasitic capacitance of the transformer.

Embodiments of the present invention are directed to method. A non-limiting example of the method includes determining a parasitic capacitance associated with a transformer, determining a resonant circuit configuration based at least in part on the parasitic capacitance associated with the transformer, and providing a resonant converter comprising the resonant circuit and the transformer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

FIG. 3a depicts a circuit topology of a parallel resonant converter (PRC) according to one or more embodiments;

FIG. 3b depicts a circuit topology of series parallel resonant converter (SPRC) according to one or more embodiments;

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
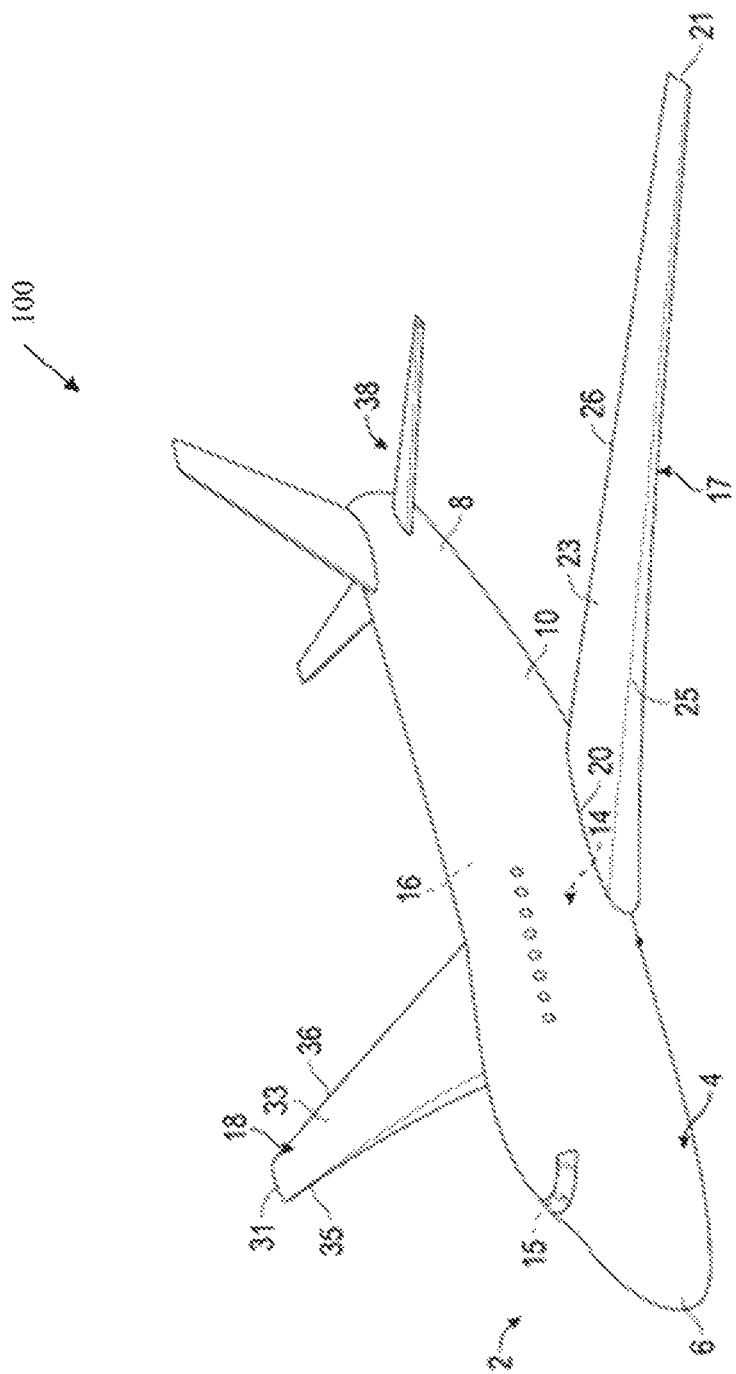
FIG. 1 is a perspective view of an aircraft that may incorporate embodiments of the present disclosure.

Referring now to the figures, FIG. 1 depicts a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger or cargo compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2.

Turning now to an overview of technologies that are more specifically relevant to aspects of the invention, efficiency and consistency in power conversion is needed as aircrafts become more reliant on electric power. A direct current to direct current (DC-DC) converter is an electronic circuit that converts a source of direct current (e.g., battery, etc.) from one voltage level to another voltage level to drive a load for an aircraft application. The DC-DC converters can be connected to a common or shared bus with a variety of electrical components coupled to the bus, the electrical component may each require a different power needs to operate within the aircraft. Typical DC-DC converter configurations can include a so called LLC and CCL converters which can be utilized for a variety of applications including fast moving electrical aircraft applications. However, for these converters, variations in magnetic components included in the converter can result in low yield and increased loss efficiency. Aspects described herein utilize the parasitic capacitance present in magnetic components of a DC-DC converter as a component of a resonant network in the DC-DC converter.

Figure 2:
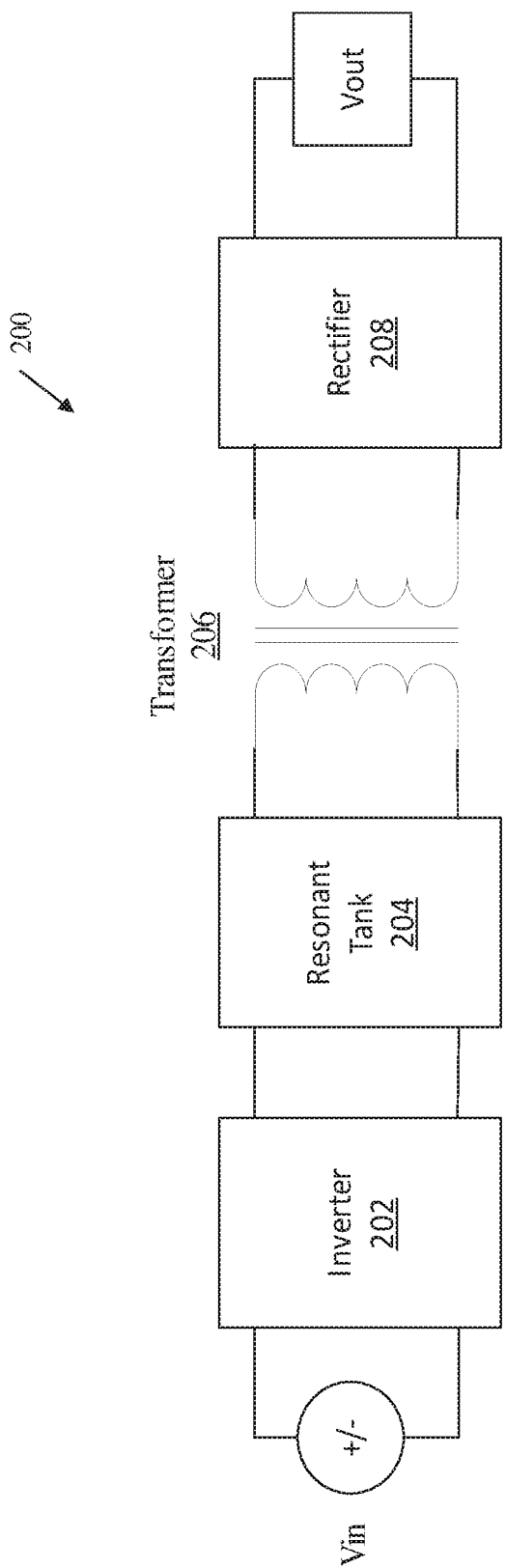
FIG. 2 depicts a block diagram of a resonant DC-DC converter according to one or more embodiments.

A resonant converter is a type of electric power converter that contains a network of inductors and capacitors called a "resonant tank" tuned to resonate at a specific frequency. This resonant tank is a component of the resonant converter that shapes the input signal to sinusoidal. The ZVS (Zero Voltage Switching) helps to minimize the switching losses. FIG. 2 depicts a block diagram of a resonant DC-DC converter according to one or more embodiments. The resonant DC-DC converter 200 includes a DC power source Vin, an inverter 202, a resonant tank 204 (sometimes referred to as an "LC network," "resonant network" or "resonant circuit"), a transformer 206, a rectifier 208, and an output voltage Vout. In one or more embodiments, the inverter 202 can be implemented utilizing a full-bridge or a half-bridge structure using a number semiconductor switches. The resonant tank 204 is utilized to create conditions for lossless turn-on and turn-off of the semiconductor switches in the half-bridge or full-bridge structure of the inverter 202. For ease of illustration and explanation, the remaining figures will show a half-bridge structure; however, any inverter structure utilizing semiconductor switching (e.g., metal oxide semiconductor field effect transistors (MOSFETs)) can be utilized herein.

In one or more embodiments, the DC-DC converter 200 is utilized to change the input voltage Vin value to a different voltage value at Vout. That is to say, the voltage is either stepped up or stepped down by the DC-DC converter 200 circuit. The input voltage Vin is a direct current voltage source such as, for example, a battery or set of batteries. The input voltage Vin is coupled to the inverter 202 which converts the DC input into an AC output. As mentioned above and described further below, the inverter 202 includes a halfwave structure which converts the DC voltage input into an AC square wave. The AC square wave input is then inputted into the resonant tank 204 before being inputted into the transformer 206. Based on the configuration of the transformer 206, the voltage value of the AC square wave input is either stepped up (increased) or stepped down (decreased). The rectifier 208 converts the AC output of the transformer 206 into a DC output at Vout. Rectifiers are an electrical device that converts alternating current (AC), which periodically reverses direction, to direct current (DC), which flows in only one direction.

In one or more embodiments, the transformer 206 is a planar transformer. Planar transformers are advantageous due to their small size and more efficient energy transfer. A planar transformer is essentially a transformer that uses flat windings, usually on a printed circuit board (PCB), instead of copper wire to form the coils. Planar transformers use stacked PCBs to form the required number of turns and their construction forms the inter-winding capacitance known as parasitic capacitance.

In one or more embodiments, the parasitic capacitance can be utilized as part of a resonant tank in a resonant converter. As mentioned above and further herein, the resonant tank 204 includes a network of inductors and capacitors. In one or more embodiments, a resonant converter can include a resonant tank that sizes and selects one or more inductors and/or capacitors for inclusion based on an antici-pated parasitic capacitance from a planar transformer included in the resonant converter.

FIG. 3a depicts a circuit topology of a parallel resonant converter (PRC) according to one or more embodiments. The PRC 300a includes the various components from depicted in the block diagrams of FIG. 2. The input voltage Vin is coupled to the inverter stage (switching network) of the PRC 300a. Series connected switches Q1 and Q2 in a half-bridge configuration are used as the inverter stage (switched network). With 50% complementary duty-cycle on the series connected switches Q1 and Q2, a pulsating signal with peak voltage Vin is fed to the resonant tank stage. In the PRC 300a, the resonant tank stage includes inductor Lr in series with capacitor Cr. The PRC 300a also includes a transformer with a primary winding np and two secondary windings ns1, ns2. The transformer is coupled to a rectifier stage in the PRC 300a that includes two diodes D1, D2 in a half-bridge configuration. A filter including inductor Lf and capacitor Cf is coupled between the rectifier stage and the output Vout to match impedances. In one or more embodiments, a controller 320a can be utilized to operate the switches Q1 and Q2 and output an alternating current (AC) at a specific frequency based on the switching operation.

FIG. 3b depicts a circuit topology of series parallel resonant converter (SPRC) according to one or more embodiments. The SPRC 300b is similar to the PRC 300a (from FIG. 3a) except that the resonant tank stage includes inductor Lr, capacitor Csr, capacitor Cpr. In the SPRC 300b resonant tank, with the load in series with Lr and Csr, the circulating energy is smaller compared with the PRC 300a (from FIG. 3a). With the parallel capacitor Cpr, the SPRC 300b can regulate the output voltage Vout at no load condition. Series connected switches Q3 and Q4 in a half-bridge configuration are used as the inverter stage (switched network). With 50% complementary duty-cycle on the series connected switches Q3 and Q4, a pulsating signal with peak voltage Vin is fed to the resonant tank stage. In one or more embodiments, the controller 320b can be utilized to operate the switches Q3 and Q4 and output an alternating current (AC) at a specific frequency based on the switching operation.

Figure 4A:
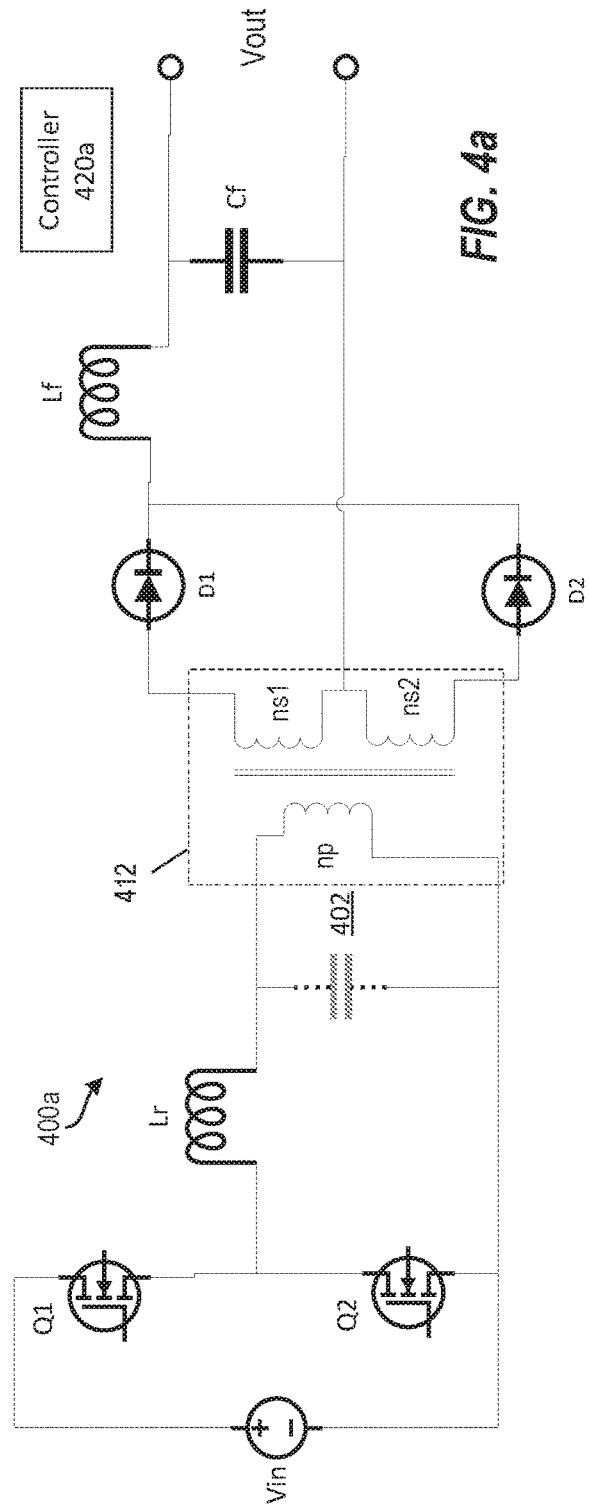
FIG. 4a depicts a parallel resonant converter (PRC) using parasitic capacitance according to one or more embodiments.
Figure 4B:
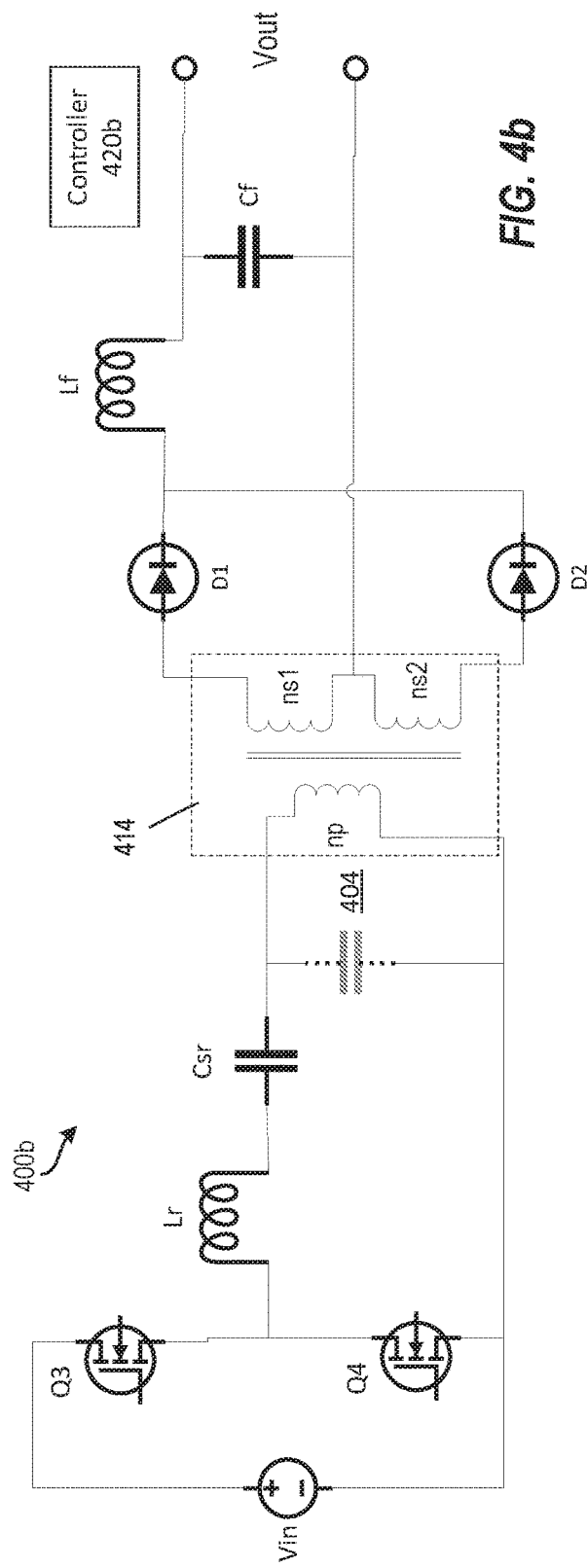
FIG. 4b depicts a series parallel resonant converter (SPRC) using parasitic capacitance according to one or more embodiments.

In one or more embodiments, the PRC and SPRC can operate with the removal of capacitor Cr (in FIG. 3a) and capacitor Cpr (in FIG. 3b) by using the parasitic capacitance of the transformer. FIG. 4a depicts a parallel resonant converter (PRC) using parasitic capacitance according to one or more embodiments. In the PRC 400a, capacitor Cr (in FIG. 3a) is removed and a capacitance 402 from the transformer is utilized as the parallel capacitor. The inductor Lr in the resonant tank is sized and configured according to the calculated value of the parasitic capacitance of the transformer 412. In one or more embodiments, the controller 320a can be utilized to operate the switches Q1 and Q2. In addition, FIG. 4b depicts a series parallel resonant converter (SPRC) using parasitic capacitance according to one or more embodiments. In the SPRC 400b, capacitor Cpr (in FIG. 3b) is removed and a capacitance 404 from the transformer is utilized as the parallel capacitor. The inductor Lr and capacitor Csr in the resonant tank is sized and configured according to the calculated value of the parasitic capacitance of the transformer 414. In one or more embodiments, the controller 420b can be utilized to operate the switches Q3 and Q4.

In one or more embodiments, during design of the PRC 400a and SPRC 400b, the parasitic capacitance can be determined based on the characteristics of the transformers 412, 414. That is to say, the capacitance formed by layers of the planar transistors used in the PRC and SPRC circuits are utilized as capacitance for the resonant tank and will be tuned to required capacitance values in the manufacturing process. The resonant frequency can be determined based on the values of the components and the parasitic capacitance values. The resonant frequency can be outputted from the inverter stage of the PRC 400*a* and SPRC 400*b* by operation of the switches Q1, Q2, Q3, and Q4 by controllers 420*a*, 420*b*. In one or more embodiments, the following equations (Eq. 1-3) can determined the parasitic capacitance based on the planar transformer turns ratio, defined as k.

$$C_p = C_{po} + (1-k) \cdot C_{pso} \qquad \text{Eq. 1}$$

$$C_s = k^2 \cdot C_{so} - k \cdot (k-1) \cdot C_{pso} \qquad \text{Eq. 2}$$

$$C_{str} \approx C_p + C_s \qquad \text{Eq. 3}$$

Capacitance can be calculated using equation 1-3. where Cp and Cs are the capacitance formed by primary and secondary side Cpso is mutual capacitance formed by transformer windings, with respect to turns ratio k, where k is the turns ratio. The mutual capacitance Cpso due to the electrical coupling between the primary and the secondary windings can be approximately measured directly by shorting both primary and secondary sides. The single equivalent capacitance referred to the primary side, Cstr. For known turns ratio, maintain the Cpso to desired level and then calculate the Cp and Cs then add them to get Stress capacitance Cstr. Post construction of transformer primary and secondary coil would be shorted to measure the Cpso, then Cstr will be approximated The configurations of the PRC 400*a* and SPRC 400*b* have the benefit of saving the space of the capacitor on the printed circuit board and provide the use of parasitic values in the design. In one or more embodiments, the controller 320*a* (in FIG. 3*a*), controller 320*b* (in FIG. 3*b*), controller 420*a* (in FIG. 4*a*) and controller 420*b* (in FIG. 4*b*) can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 5:
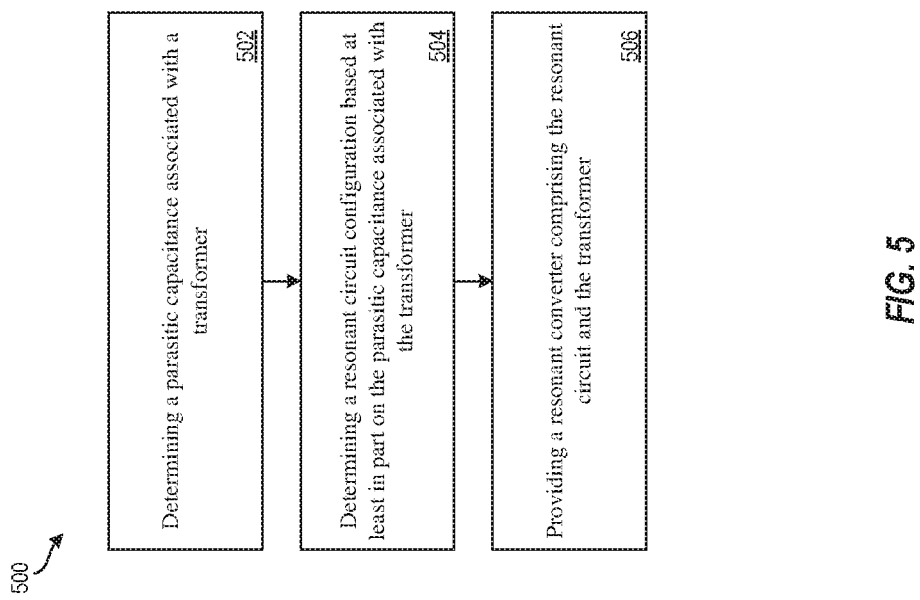
FIG. 5 depicts a flow diagram of a method for using parasitic capacitance of a transformer as an element in a resonant circuit according to one or more embodiments.

FIG. 5 depicts a flow diagram of a method for using parasitic capacitance of a transformer as an element in a resonant circuit according to one or more embodiments. The method 500 includes determining a parasitic capacitance associated with a transformer, as shown in block 502. The parasitic capacitance is calculated based on the configuration and characteristics of the transformer. The method 500, at block 504, includes determining a resonant circuit configuration based at least in part on the parasitic capacitance associated with the transformer. The configuration of the resonant circuit can include inductors and capacitors that are sized based on the parasitic capacitance value of the transformer to determine resonant frequency. And at block 506, the method 500 includes providing a resonant converter comprising the resonant circuit and the transformer.

Additional processes may also be included. It should be understood that the processes depicted in FIG. 5 represent illustrations, and that other processes may be added or existing processes may be removed, modified, or rearranged without departing from the scope and spirit of the present disclosure.

Various embodiments are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a power inverter;
a resonant circuit coupled to a planar transformer, the planar transformer including a stack of printed circuit board (PCB) layers, the PCB layers including windings defining a number of winding turns that establishes a parasitic capacitance of the planar transformer; and
a rectifier coupled to an output of the planar transformer;
wherein the resonant circuit comprises at least one inductor;
wherein a resonant frequency for the resonant circuit is based on the at least one inductor and the parasitic capacitance established by the of the stack of printed circuit board (PCB) layers included in the planar transformer.

2. The system of claim 1, wherein the power inverter comprises a plurality of switches operated by a controller.

3. The system of claim 2, wherein the plurality of switches comprise metal-oxide-semiconductor field effect transistors (MOSFETs) or Silicon Carbide MOSFETs.

4. The system of claim 1, wherein the power inverter comprises a half bridge structure.

5. The system of claim 1, wherein the power inverter comprises a full bridge structure.

6. The system of claim 1, further comprising a power supply, wherein the power supply comprises a voltage source.

7. A system comprising:
a power inverter;
a resonant circuit coupled to a planar transformer, the planar transformer including a stack of printed circuit board (PCB) layers, the PCB layers including windings defining a number of winding turns that establishes a parasitic capacitance of the planar transformer; and
a rectifier coupled to an output of the planar transformer;
wherein the resonant circuit comprises at least one inductor and at least one capacitor;
wherein a resonant frequency for the resonant circuit is based on the at least one inductor, the at least one capacitor, and the parasitic capacitance established by the stack of printed circuit board (PCB) layers included the planar transformer.

8. The system of claim 7, wherein the power inverter comprises a plurality of switches operated by a controller.

9. The system of claim 8, wherein the plurality of switches comprise metal-oxide-semiconductor field effect transistors (MOSFETs) or Silicon Carbide MOSFETs.

10. The system of claim 7, wherein the power inverter comprises a half bridge structure.

11. The system of claim 7, wherein the power inverter comprises a full bridge structure.

12. The system of claim 7, further comprising a power supply, wherein the power supply comprises a voltage source.

13. A method comprising:
stacking a plurality of printed circuit board (PCB) layers that include windings to form a planar transformer;
forming a number of winding turns of the planar transformer using the windings included in the stack of PCB layers;
determining a parasitic capacitance based on the number of winding turns of the planar transformer;
determining a resonant frequency of a resonant circuit configuration based at least in part on the parasitic capacitance established by the number of winding turns defined by the winding included in the stack of printed circuit board (PCB) layers included the planar transformer; and
providing a resonant converter comprising the resonant circuit having the resonant frequency and the planar transformer.

14. The method of claim 13, wherein the parasitic capacitance associated with the transformer is determined based at least in part on a turns ratio of the transformer.

15. The method of claim 13, wherein the resonant circuit comprises at least one inductor.

16. The method of claim 13, wherein the resonant circuit comprises at least one inductor and at least one capacitor.

17. The method of claim 13, wherein the resonant converter further comprises:
a power inverter;
a rectifier; and
a power source.

* * * * *